Oct. 28, 1952     E. H. FLETCHER ET AL     2,615,430
VARIABLE POSITION CONTROL FOR HYDRAULIC SERVOMOTORS
Filed May 19, 1951     3 Sheets-Sheet 1

INVENTORS
E. H. Fletcher, P. L. Hanson &
T. Nakae
BY
*C. T. Parker and L. H. Kurth*
Attorneys Oct. 28, 1952 E. H. FLETCHER ET AL 2,615,430
VARIABLE POSITION CONTROL FOR HYDRAULIC SERVOMOTORS
Filed May 19, 1951 3 Sheets-Sheet 2
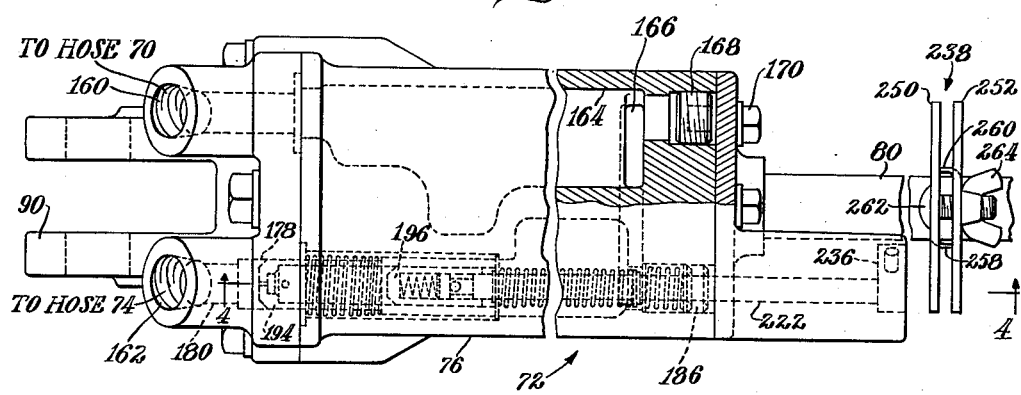
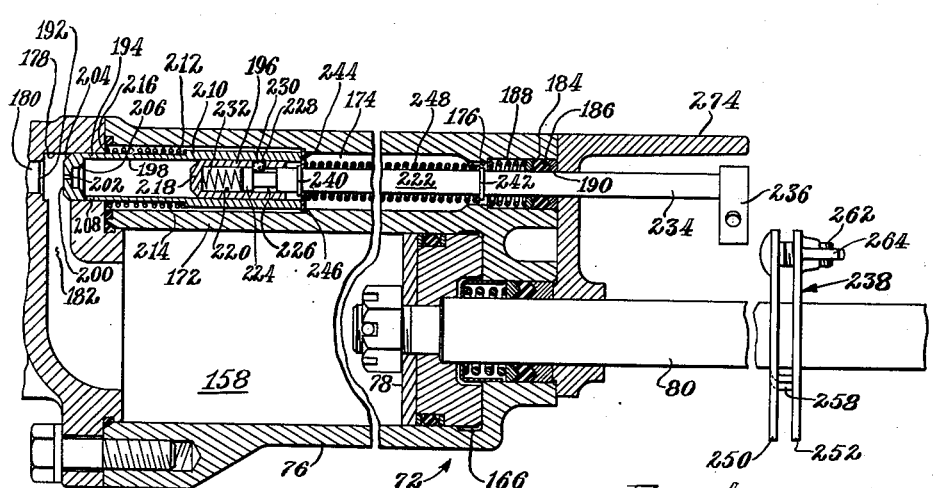
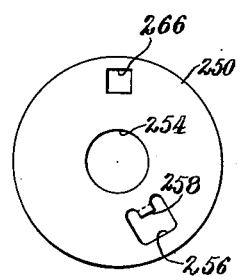
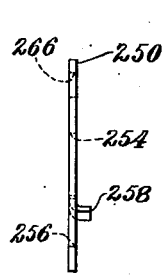
INVENTORS
E. H. Fletcher, P. L. Hanson &
T. Nakae
BY
Attorneys INVENTORS
E.H. Fletcher, P.L. Hanson &
T. Nakae Patented Oct. 28, 1952

2,615,430

UNITED STATES PATENT OFFICE 2,615,430

VARIABLE POSITION CONTROL FOR HYDRAULIC SERVOMOTORS

Edward H. Fletcher, Cedar Falls, and Paul L. Hanson and Takuro Nakae, Waterloo, Iowa, assignors to Deere Manufacturing Co., Dubuque, Iowa, a corporation of Iowa Application May 19, 1951, Serial No. 227,246

7 Claims. (Cl. 121—38)

This invention relates to a hydraulic system and more particularly to means for controlling the extent of relative movement of hydraulically powered parts.

The embodiment of the invention disclosed herein was designed primarily for and finds its greatest utility in connection with the control of adjustable parts of agricultural implements. In the ordinary situation, an agricultural implement, such as a plow, is drawn by a tractor and has a plow bottom adjustable vertically between transport and ground-working positions. The tractor is equipped with a hydraulic pump and distributing valve that form part of a fluid-pressure system including a fluid motor for adjusting the plow. This motor ordinarily takes the form of a cylinder and piston assembly, one end of the cylinder being anchored on the plow frame and the free end of the piston rod being connected to appropriate linkage for raising and lowering the plow.

In the operation of a tractor-plow unit of the type described generally above, it is necessary for the operator to actuate the fluid-pressure system at the end of each furrow to effect raising of the plow bottom from its ground-working position, so that the unit can be turned about and driven over the field to cut an adjacent and parallel furrow. It is desirable in instances such as these that means be provided to enable the operator to lower the plow bottom again to the same ground-working position as before. In the fluid-pressure systems known in the past, it has been customary to provide a stop cooperative between the cylinder and the piston to positively determine the extent of relative movement between the two, and consequently to determine the extent of lowering of the plow bottom to ground-working position. Although stop means such as this is generally satisfactory, it is found in some circumstances that it is desirable or necessary to lower the plow bottom to an extent greater than its previous working depth. If the stop means is rigidly although adjustably fixed, the desirable variation can be accomplished; however, this requires that the operator dismount from the tractor and make the necessary adjustment, after which he must make the necessary readjustment.

According to the present invention, an improved hydraulic system is provided which has limit or control means that may be adjusted by the operator by means of the control lever for the distributing valve, which is located convenient to him on the tractor. Primarily, the invention resides in a valve for controlling the flow of fluid to or from the chamber of the fluid-pressure cylinder, so that when the system reaches a predetermined point in its stroke, the valve is partially closed to an extent sufficient to permit throttling action which so restricts the passage as to create an abnormal rise in pressure, with the result that the safety or pressure-relief valve of the system is caused to operate, whereupon the distributing valve control lever is returned to neutral and fluid pressure is no longer transmitted to the cylinder. Inasmuch as the closing action of the valve is not positive; that is, the valve does not completely close the passage, there is a restricted passage through which fluid may flow at a reduced rate. Therefore, the operator can again move his control valve to operating position and thus allow the system to circulate fluid at such reduced rate, thereby allowing further relative movement between the cylinder and piston in the same direction but at a lower speed.

A further object of the invention is to incorporate in the valve means for completely or positively closing the passage after a predetermined extent of relatively low-speed movement between the cylinder and piston so that after such predetermined amount of travel, a positive stop between the cylinder and piston is effected.

The invention has for a further feature the provision of improved valve means of the character specified which is so constructed and designed as to require a minimum of modification in hydraulic systems of existing types.

Other objects and important features inherent in and encompassed by the invention will become apparent to those versed in the art as a complete disclosure of a preferred embodiment of the invention is made in the following detailed description and accompanying sheets of drawings, in which Figure 1 is a partial side elevational view of a tractor and attached plow equipped with a hydraulic system having the components as outlined above;

Figure 3 is an enlarged top plan view of the cylinder and piston assembly, with a portion of the cylinder being broken away to disclose one of the fluid passages therein;

Figure 4 is a longitudinal sectional view taken substantially on the line 4—4 of Figure 3, showing the piston in its fully extended position;

Figures 7 and 8 are end and side elevational views respectively of one of the detail parts of one form of adjustable stop means;

Figure 1:
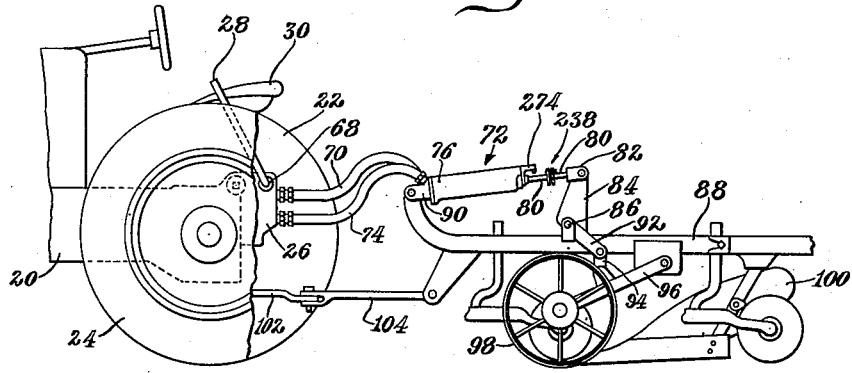
Figure 2:
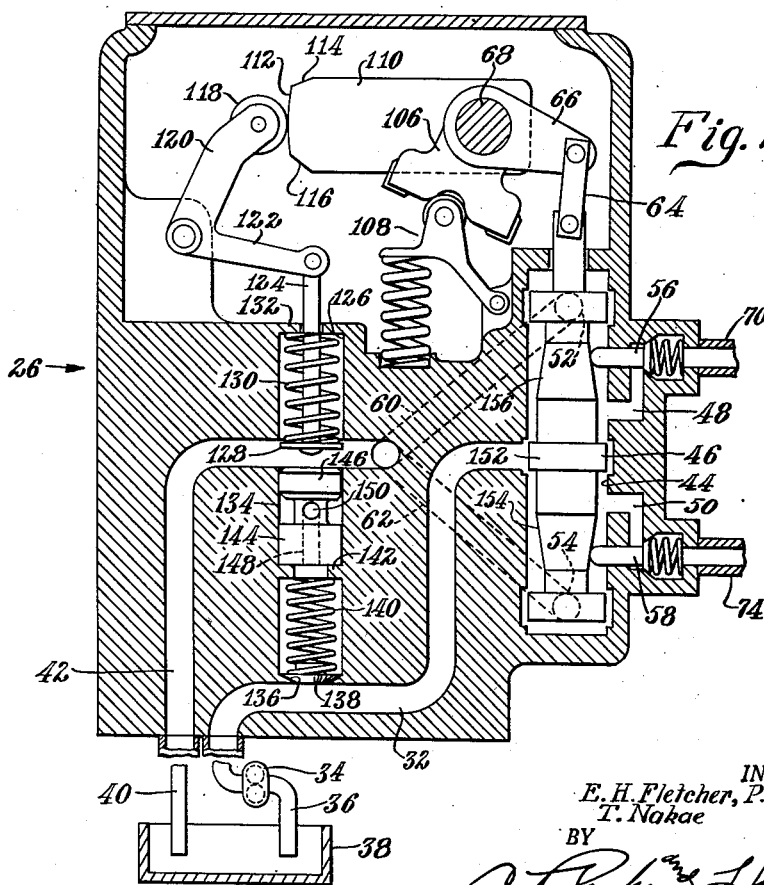
Figure 2 is an enlarged sectional view of one type of distributing valve for the hydraulic system.

*Hydraulic system in general—Figures 1 and 2*

As mentioned above, the embodiment of the invention disclosed herein was designed primarily for use with an agricultural unit of the type including a power vehicle and an implement having an adjustable part. It will be understood, of course, that the invention has wider application. Further, the specific illustration of tractor and attached plow is merely representative of one of the several applications of which the invention is capable. Therefore, the present disclosure should be taken as illustrative and not limiting.

The tractor illustrated in Figure 1 is typical of a conventional tractor and has a longitudinal body 20 carried on right- and left-hand traction wheels 22 and 24, a portion of the left-hand wheel being broken away to expose a distributing valve housing 26 which contains a distributing valve (Fig. 2) that forms part of a hydraulic or equivalent fluid-pressure system. The distributing valve is operated by a control lever 28 that is convenient to an operator's seat 30 on the tractor.

Referring now to Figure 2, it will be seen that the distributing valve comprises a casing having a high-pressure or inlet passage 32 that is supplied with fluid under pressure by means of a circulating pump 34. This pump has an intake 36 connected to a reservoir 38. The reservoir in turn communicates through a line 40 with a low-pressure passage 42 in the distributing valve housing or casing 26.

The distributing valve casing is provided with a vertical valve bore 44 within which is carried a shiftable valve 46. This bore communicates intermediate its ends with the high-pressure passage 32 and the valve 46 is operative to effect control of a pair of motor ports 48 and 50 and a pair of exhaust ports 52 and 54. The motor ports 48 and 50 are provided respectively with spring-loaded check valves 56 and 58. The exhaust ports 52 and 54 are respectively connected by branch passages 60 and 62 with the low-pressure passage 42.

Figure 5:
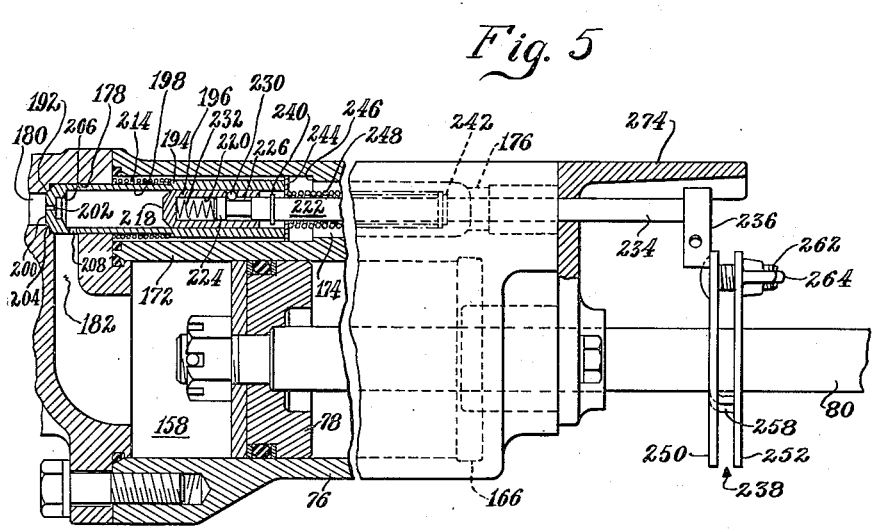
Figures 5 and 6 are longitudinal sectional views similar to Figure 4 but showing the piston in different positions and likewise showing different positions of the components of the control means.
Figure 6:
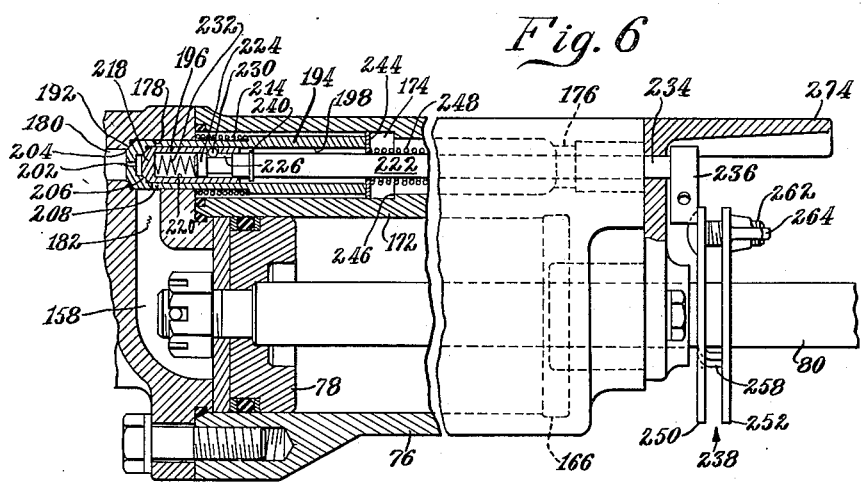

The valve 46 is shiftable selectively in opposite directions vertically in the valve bore 44 by means of linkage 64 connected to an arm 66 fixed to a rockshaft 68. This rockshaft extends at one side of the distributing valve and is fixed to the lower end of the control lever 28. The upper motor port 48 is connected by a fluid-pressure-transmitting means including a hose 70 to one end of a fluid-pressure motor designated generally by the numeral 72. The lower motor port 50 is similarly connected by a hose 74 to the motor 72. The motor has first and second members, here respectively in the form of a cylinder 76 and piston 78 (Figures 4, 5 and 6). The interior of the cylinder member is provided as a chamber to which fluid may be supplied or from which fluid may be exhausted to effect back-and-forth movement of the piston 78. The member comprising the piston 78 further includes an external part in the form of a piston rod 80, the free or outer end of which has a clevis 82 for effecting connection to a rockable arm 84 pivoted at 86 on a plow frame 88. The closed end of the cylinder 76 has a clevis 90 anchored to the plow frame 88.

The rockable arm or member 84 is in the form of a bell crank having a second arm 92 which is connected by a link 94 to a crank axle 96 on which is journaled a ground-engaging wheel 98. The plow frame carries a plow bottom 100, shown in a transport position in Figure 1.

From the description thus far it will be seen that relative extension of the cylinder 76 and piston rod 80 will effect clockwise rocking of the bell crank member 84—92 and will consequently raise the plow frame 88 and plow 100 relative to the ground-engaging wheel 98. Substantially full extension of the piston rod 80 is illustrated in Figure 1.

Conversely, retraction of the piston rod 80 will effect counterclockwise rocking of the bell crank 84—92 to lower the plow bottom to a selected ground-working position.

As will be hereinafter brought out in greater detail, the upper hose transmits fluid under pressure from the distributing valve to the right-hand end of the cylinder 76 for effecting retraction of the piston rod 80 and consequently lowering of the plow bottom 100. During this phase of the operation of the system, fluid is exhausted from the left-hand end of the cylinder 76 via the lower hose 74 and ultimately through the branch passage 62, low-pressure passage 42 and line 40 to the reservoir 38. When the fluid-pressure flow is reversed, fluid under pressure is supplied through the lower hose 74 to the left-hand end of the cylinder 76 for effecting extension of the piston rod and consequently raising of the plow bottom 100. At the same time, the upper hose 70 becomes a medium for transmitting fluid exhausted from the right-hand end of the cylinder back through the distributing valve casing to the reservoir 38.

The connection of the plow frame 88 to the tractor for travel of the two together is effected by a hitch including a drawbar 102 on the tractor and a draft member 104 on the plow, as is generally conventional.

The distributing valve illustrated is of the type in which the main control valve is automatically returned to neutral position upon the occurrence of an abnormal pressure rise in the system. The neutral position of the valve 46 is illustrated in Figure 2. The rockshaft 68 has fixed thereto a centrally notched plate 106 which has its central or neutral position established by a spring-loaded arm and roller means 108. The rockshaft 68 has also fixed thereto a radially extending plate 110 having an arcuate edge 112 formed about the axis of the rockshaft. The arcuate edge terminates at its opposite ends in cut-off corners 114 and 116. In the neutral or central position of the plate 110 as illustrated in Figure 2, the arcuate edge 112 is engaged by a roller 118 carried on one arm 120 of a bell crank having a second arm 122. A rod 124 depends from the free end of the bell crank arm 122 into a vertical bore 126 and is headed at 128 to confine one end of a coiled compression spring 130, the other end of which is retained by a radial wall portion 132 at the upper end of the bore 126.

The bore 126 intersects the low-pressure passage 42 and is coaxial with a second bore 134 which intersects the passage 42 and further intersects the high-pressure passage 32. The lower end of the bore 134 is provided with a valve seat 136 normally closed by a valve 138 biased to closed position by a coiled compression spring 140. The bore 134 is divided into upper and lower portions by an intermediate, apertured, radial wall 142 above which is carried a valve 144. This valve is headed at 146 and has an axial passage 148 opening at the lower end of the valve and a communicating radial passage 150 opening below the head 146.

In order that lowering of the plow bottom 100 to ground-working position may be effected, the control lever 28 is moved rearwardly from its position shown in Figure 1, thus effecting clockwise rocking of the rockshaft 68. This is followed by downward movement of the valve 46. An enlarged intermediate portion 152 on the valve 46 cuts off the lower portion of the valve bore 44 from communication with the high-pressure passage 32 and the upper motor port 48. A lower tapered portion 154 on the valve 46 simultaneously effects opening of the lower check valve 58. Exhaust fluid returning through the hose 74 and motor port 50 may return to the reservoir via the exhaust port 54, the branch passage 62, the low-pressure passage 42 and line 40.

When the control lever 28 is moved forwardly to effect counterclockwise rocking of the rockshaft 68, the valve 46 moves upwardly in the valve bore 44 and the valve portion 152 cuts off the upper portion of the valve bore so that fluid under pressure is transmitted through the lower motor port 74 to the motor 72. Simultaneously, a tapered portion 156 at an upper portion of the valve 46 opens the check valve 56 for the motor port 48. Exhaust fluid returning through the hose 70 and motor port 48 finds its way to the reservoir through the exhaust port 52, the branch passage 60, low-pressure passage 42 and line 40.

The main control valve 46 is maintained in either its "raise" or "lower" position by means of the roller 118 on the bell crank 120—122 and is urged toward neutral position by the spring-loaded arm and roller 108. For example, when the rockshaft 68 is rocked in a clockwise direction to move the valve 46 downwardly, the notched plate 106 moves so that the end of the plate rather than the notch engages the roller on the arm and roller means 108. At the same time, the arcuate edge 112 on the plate 110 departs from the roller 118 and the cut-off corner 116 engages this roller. The spring-loading effected by the compression spring 130 maintains the roller 118 in engagement with the cut-off corner 116, and thus maintains the position of the main control valve 46. Now, should there occur an abnormal rise in pressure in the system, the relief valve 138 is unseated and fluid flowing upwardly through the bore 134 raises the valve 144 to an extent sufficient to by-pass fluid pressure through the passages 148 and 150 to the low-pressure passage 42; at the same time the head 146 of the valve 144 engages the headed end 128 of the rod 124. This action moves the rod upwardly against the loading of the spring 130 and releases engagement between the roller 118 and the cut-off corner 116 on the plate 110. The spring-loaded arm and roller means 108 is constantly urging the plate 106 (and consequently the rockshaft 68) to the intermediate or central position of Figure 2. Hence, the arm and roller means 108 is operative to return the rockshaft and hence the control valve 46 to neutral position, whereupon fluid may circulate idly between the pump and valve at no appreciable pressure. At the same time, the two check valves 56 and 58 close and maintain the position of the piston 78 relative to the cylinder 76.

*Fluid motor and control thereof—Figures 3 to 10*

The cylinder or first motor member 76 has an interior chamber 158 within which the piston 78 of the second motor member is axially reciprocable and which is provided with appropriate passages for supplying fluid thereto or exhausting fluid therefrom at its opposite ends. As best shown in Figure 3, the left-hand end of the cylinder 76 is provided with first and second internally threaded openings 160 and 162. The passage of which the opening 160 forms a part includes an elongated cored passage portion 164 which runs lengthwise of the upper portion of the cylinder. This passage portion communicates at the right-hand end of the cylinder with a generally annular groove 166 which is in part concentric with the cylinder chamber 158. The coring of the passage portion 164 is facilitated by the provision of an opening 168 at the right-hand end of the cylinder. This opening is tapped and receives a closure plug 170.

Except for the communication at 166, the passage portion 164 is separated from the cylinder chamber 158 by an upper cylinder wall portion 172. This wall portion is of substantial thickness and is cored lengthwise thereof to provide a housing portion 174 that opens at the right-hand end of the cylinder as a communicating bore 176 and that opens at the left-hand end of the cylinder as a communicating bore 178 which in turn communicates through a reduced counterbore 180 with the opening 162 to which the hose 74 is connected. The passage portion comprising the bore 180 includes as an extension thereof a further passage portion 182 that communicates with the left-hand end of the cylinder chamber 158 (Figures 4, 5 and 6).

The bore portion 176 at the other end of the housing or chamber 174 is slightly enlarged at 184 and is fitted with an appropriate annular seal 186 that is spring-loaded at 188 and that is further provided with an axial bore 190.

The junction of the passage means 180 and 182 is effected by a port 192, which port is here shown as including an annular seat.

The improved valve mechanism comprises a first or outer valve 194 of elongated construction carried for axial movement in the bore 178, and a second or inner valve 196 carried for axial movement within an axial bore 198 that provides an interior in the first valve 194. The left-hand end of the valve 194 is closed by a radial wall 200, with the exception of the provision of a throttling orifice 202. The radial wall 200 has an external seat 204 and an internal seat 206. The throttling orifice communicates with the interior of the valve 194 and combines with a second throttling orifice 208 to constitute throttling passage means communicating the seats 204 and 206.

The axial bore 198 in the valve 194 gives the valve an annular or circumferential wall 210 that has on an external portion thereof an annular shoulder 212 against which abuts one end of biasing means in the form of a coiled compression spring 214. The other end of the spring abuts against a radial wall 216 forming part of the cylinder casting. Thus, the biasing means 214 normally urges the valve 194 to a position in which the port 192 is open to the passage of fluid in either direction through the passage means 180—182.

The second valve 196 is smaller and shorter than the valve 194 and has a closed end providing an external valve seat 218. As will be explained below, the valve seat 218 cooperates with the valve seat 206 on the inside of the valve 194 to cut out or close the throttling passage means 202—208. The other end of the valve 196 is open and is proximate to the open end of the outer valve 194. The valve 196 has a hollow interior provided by an axial bore 220. The left-hand end of an elongated control member 222 is received within the axial bore 220 and has a headed terminal portion 224 behind which is an outwardly opening recess provided by an annular groove 226. The annular wall provided on the valve 196 because of the axial bore 220 has therein a radial opening 228 in register with the annular groove or recess 226. A locking element in the form of a small ball 230 is received in the opening 228 and recess 226 and prevents axial separation of the valve 196 and control member 222 under action of biasing means in the form of a light compression spring 232. This spring acts between the headed end 224 of the control rod 222 and the interior of the valve 196. The annular wall 210 of the outer valve 194 is extended in such manner as to overlie the ball 230; and as long as the parts are assembled, the annular wall 210 of the valve 194 prevents escape of the ball 230 from the opening, thus establishing a connection between the valve 196 and control rod 222. The axial length of the groove 226 substantially exceeds the maximum dimension of the ball 230; therefore, the connection at 230—236 constitutes a lost-motion connection, the purposes of which will presently appear.

The control rod 222 extends outwardly through the bore 190 in the seal 186 and has an external portion 234 on which is fixedly mounted a lug 236. A control or stop element, designated generally by the numeral 238, is carried by the piston rod 80. The disposition of the lug 236 is such that it may be at times engaged by the stop means 238. Thus, as the piston rod 80 and piston 78 move toward the left, or in a direction in which fluid is exhausted through the passage means 182—180—162, the stop means 238 will engage the lug 236, thus shifting the control rod 222 to the left and therefore the control rod reflects movement of the piston 78 and piston rod 80.

The intermediate portion of the control rod 222 is provided with a pair of spaced-apart stops in the form of snap rings 240 and 242. Against one of these stops (240) and against the proximate open end of the outer valve 194 is a washer 244 that abuts to the right against an annular shoulder 246 formed in the bore 174. Biasing means in the form of a coiled compression spring 248 acts between the washer 244 and the snap ring 242 and normally is operative to urge the control rod 222 to the right.

The form of stop means shown in Figures 1 through 8 comprises a pair of plates 250 and 252, each of which is circular as shown in Figure 7 and each of which has a central aperture 254. The apertures are tolerably larger than the piston rod 80 so that there is a close sliding fit.

The description of this means in detail will be based on the plate 250. It will be understood, of course, that the plates are identical but that they are asymmetrically arranged in assembly. The plate 250 is cut out at 256 and the cut-out portion is bent outwardly to provide a lug 258. The other plate 252 has a similar lug 260. This lug appears only in Figure 3. When the two plates are assembled, the lugs 258 and 260 are angularly offset and the lugs respectively engage the other of the plates to provide fulcrum means below the piston rod 80. Above the piston rod, the two plates are compressibly secured together by means of a bolt 262 and a wing nut 264. The bolt is passed through a pair of alined apertures 266 in the plates. The assembly 238 may be shifted axially on the piston rod by loosening of the wing nut 264. When the assembly is located in its desired position, it may be secured against movement relative to the piston rod by tightening the wing nut 264.

Figure 9:
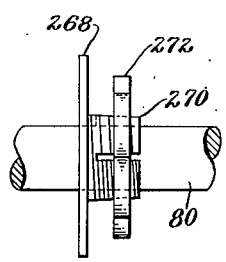
Figures 9 and 10 are side and end elevational views of a modified form of stop means.
Figure 10:
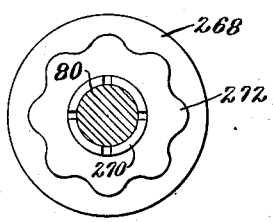

In that form of stop means shown in Figures 9 and 10, there is provided a plate 268 having a split externally threaded sleeve 270 in the form of a collet that embraces the piston rod 80. A scalloped nut 272 is threaded on the sleeve 270 and may be loosened or tightened to clamp the plate 268 adjustably to the piston rod 80.

In either case, the stop means may be selectively positioned on the piston rod so that the point at which the lug 236 on the control rod 222 is engaged may be varied. A shield or shroud 274 may be provided for protecting the external portion 234 of the control rod 222 against accidental damage.

*Operation*

When the fluid motor 72 is extended—that is, when the piston 78 is at the right-hand end of the cylinder as shown in Figure 4—the stop means 238 will be spaced to the right from the lug 236 on the control or operating member 222. The operating member will be in its maximum right-hand position because of action of the biasing means or spring 248, it being remembered that the spring or biasing means 214 holds the valve 194 also in its maximum right-hand position and against the stop provided at 244–246. Now, when the main control valve 46 is actuated to cause contraction of the motor 72, the piston 78 begins to move to the left, carrying with it the piston rod 80, of course, and the stop means 238. Figure 4 may be taken as representative of the instant just before the stop means 238 engages the lug 236.

As the stop means 238 continues its movement to the left along with the piston 78 and piston rod 80, it engages the lug 236 and forces the control rod 222 to the left. The spring 248 is compressed between the stops established by the snap ring 242 and the washer 244 and therefore the spring 248 acts as force-transmitting means for forcibly moving the valve 194 to the left against the bias of the spring 214. This results, as shown in Figure 6, in movement of the valve 194 to its port-restricting position, wherein the external seat 204 seats on the port seat 192 and wherein the throttling orifice 208 becomes alined with the passage 182. Therefore, the only communication between the chamber 158 of the cylinder 76 and the passage 162—180—182 is via the throttling orifices 202 and 208.

The restriction set up by movement of the valve 194 to its port-restricting position is sufficient to cause the mechanism of Figure 2 to return the main control valve to neutral, thus hydraulically locking the system temporarily against further movement out of the position determined by the stop means 238.

Now, if the operator desires to move the piston 78 further to the left, he has only to operate the main control valve lever 28 to move the main control valve 46 downwardly and effect the transmission of fluid pressure through the hose 70 to the right-hand end of the cylinder 76. The piston 78 will move to the left at a relatively slower speed, because of the restriction set up by the throttling orifices 202 and 208. Nevertheless, in a situation such as this only slow speed will be desired. Inasmuch as the spring 248 can yield further between the stopped valve 194 and the snap ring 242, the spring may be said to constitute means accommodating overtravel of the control member 222 beyond the stopped position of the valve 194. During this overtravel, the control rod 222 is effective to move the valve 196 from the position shown in Figure 5 to the final position shown in Figure 6.

During movement of the valve 196 to its final position by the control member 222 as the latter moves further to the left beyond the position established by the stopped valve 194, the spring 232 acts as yieldable force-transmitting means between the headed end 224 of the control member and the interior of the valve 196. As seen in Figure 6, the seat 218 of the valve 196 seats on the internal seat 206 of the valve 194 and thus cuts out or closes off the throttling means 202—208, resulting in a second rise in pressure in the system to actuate the mechanism of Figure 2 for the purpose of returning the control valve 46 to its neutral position. The piston 78 is now at its maximum left-hand position and there can be no overtravel.

In addition to the functions as previously described, the springs 248 and 232 have other important functions. These follow from reversal of fluid pressure; that is, the transmission of fluid pressure through the hose line 74 to the left-hand end of the cylinder so that the piston can be moved to the right. Fluid pressure against the closed end of the combined valve assembly forces the valve 196 to the right against the spring 232 and forces the valve 194 to the right against the spring 248. This allows reversal of the piston at a relatively high speed, which would be unobtainable if initial fluid flow was forced to travel through a restricted passage.

As the piston 78 and piston rod 80 move to the right, the stop means 238 is of course carried therewith. The springs 214 and 248 serve to restore the valve member 194 and control member 222 to their maximum right-hand positions for subsequent operation. Because of the interconnection at 230—226—224, the inner or second valve 196 is carried along with the control member 222.

Because of the length of the annular groove or recess 226, the lost-motion means established by the ball or locking element 230 accommodates limited relative movement between the valve 196 and the control member, thus permitting the valve 196 to open upon the reversal of fluid pressure through the line 74.

*Summary*

The improved control valve mechanism for the hydraulic system provided according to the present invention achieves all the desirable results obtainable by mechanism heretofore known; that is, there is provided means for limiting the travel of one motor member relative to another by the utilization of a selectively settable stop effective to operate a valve for the purpose of creating an abnormal rise in pressure in the hydraulic system. At the same time, over-travel of one motor member relative to the other is obtainable because of the leakage or throttling provided by the intermediate position or phase of operation of the valve 194. Of further importance is the ultimate positive blockade of the passage by the valve 196 in its final, passage-closing position.

The user of a system equipped with valve mechanism constructed according to the principles of the present invention is thus able to achieve overtravel within a limited range, which is of particular importance when the user knows precisely the extent of overtravel that can be obtained. For example, in the present instance the amount of overtravel available is one and one-half inches. Thus, the operator knows that his adjustment of an implement or equivalent part beyond the position he has preselected will not be excessive to the point of creating a dangerous or harmful condition.

Further objects and features of the invention not specifically enumerated above will undoubtedly occur to those versed in the art, as likewise will numerous modifications and alterations in the preferred embodiment of the invention illustrated, all of which may be achieved without departing from the spirit and scope of the invention as defined in the appended claims.

What is claimed is:

1. In a fluid-pressure control system having a first motor member formed with a chamber and a passage including a port through which fluid may flow incident to movement of a second motor member within the chamber: valve means for controlling the flow of fluid out of the chamber for sequentially permitting, next restricting and finally stopping such flow, comprising: a first valve movable back and forth through a relatively short distance between a port-opening and a port-closing position, said first valve being elongated along its path of movement and having an elongated hollow interior, said first valve further having a port-proximate end including an outer seat formed with restrictive passage means and with an inner seat; first means biasing the first valve to its port-opening position; a second valve carried within the interior of the first valve for movement through a relatively longer distance between an open position and a closed position, said second valve having at one end thereof a closure element cooperative with the aforesaid inner seat to close the restrictive passage means in the first valve; a control member extending loosely lengthwise into the first valve and arranged to reflect movement of the second motor member in the direction that results in fluid flow out through the port; second means acting against the first valve and the control member and normally biasing the control member in the opposite direction; lost-motion means acting between the control member and the second valve for normally holding the second valve in its open position; said second biasing means serving also as yielding force-transmitting means between the control member and the first valve to move the first valve to its port-restricting position upon initial movement of the control member in the aforesaid direction to a predetermined position, said second biasing means being yieldable to accommodate overtravel of the control member beyond said predetermined position; and said lost-motion means including a force-transmitting connection between the control member and second valve to effect closing of the second valve upon overtravel of the control member.

2. In a fluid-pressure control system having a first motor member formed with a chamber and a passage through which fluid may flow to effect movement of a second motor member within the chamber: valve means for controlling the flow of fluid for sequentially permitting, next restricting and finally stopping such flow, comprising: a first valve movable through a relatively short distance between a passage-opening position and a passage-restricting position; means biasing the first valve to its passage-opening position; a second valve movable through a relatively longer distance between a passage-opening position and a passage-closing position; a movable control member arranged to reflect movement of the second motor part; first force-transmitting means acting between the control member and the first valve for moving the first valve to its passage-restricting position upon initial movement of the control member to a predetermined position, said force-transmitting means being yieldable to provide for movement of the control member beyond said predetermined position; and second force-transmitting means acting between the control member and the second valve for moving the second valve to its passage-closing position upon said movement of the control member beyond said predetermined position.

3. In a fluid-pressure control system having support means and including a port for the flow of fluid pressure, the improvement comprising: an elongated hollow valve having one end open and its other end provided with an external seat and an internal seat and fluid-throttling passage means communicating said seats; said valve being constructed for mounting on the support means for movement along its principal axis from a biased open position in which the external seat is spaced a relatively short axial distance from the port to a throttling position in which the external seat closes the port except for the throttling means; a second valve carried within the first valve and having at one end a seat facing and cooperative with the internal seat of the first valve; said second valve being movable axially relative to the first valve from an open position, in which said second valve seat is spaced from said internal seat an axial distance greater than the aforesaid relatively short distance, to a closed position in which said second valve seat seats on said internal seat to close said throttling means; a control member extending axially into the first valve through the open end thereof for axial movement relative to the valves and toward and away from the port; lost-motion means interconnecting the second valve and the control member for movement of the two in unison away from the port; force-transmitting means acting between the first valve and the control member and biased to separate the two but effective upon movement of the control member toward the port to cause movement of the first valve to its throttling position, said force-transmitting means being yieldable to provide for overtravel of the control member toward the port subsequent to attainment by the first valve of its throttling position; and yielding means between the control member and the second valve constituting a force-transmitting connection effective to seat the second valve seat on the internal seat of the first valve incident to a predetermined extent of overtravel of the control member.

4. In a fluid-pressure control system having support means and including a port for the flow of fluid pressure, the improvement comprising: a first valve having a port-control portion provided with fluid-throttling passage means; said valve being constructed for mounting on the support means for movement along a linear path from a biased open position in which the port-control portion is spaced a relatively short linear distance from the port to a throttling position in which said portion closes the port except for the throttling means; a second valve carried by the first valve and having at one end a closure portion cooperative with the throttling means of the first valve; said second valve being movable linearly relative to the first valve from an open position, in which said closure portion is spaced from said throttling means a linear distance greater than the aforesaid relatively short distance, to a closed position in which said closure portion closes said throttling means; a control member extending proximate to the first valve for linear movement relative to the valves and toward and away from the port; lost-motion means interconnecting the second valve and the control member for movement of the two in unison away from the port; force-transmitting means acting between the first valve and the control member and biased to separate the two but effective upon movement of the control member toward the port to cause movement of the first valve to its throttling position, said force-transmitting means being yieldable to provide for overtravel of the control member toward the port subsequent to attainment by the first valve of its throttling position; and yielding means between the control member and the second valve constituting a force-transmitting connection effective to move the second valve to close said throttling means by said closure means incident to a predetermined extent of overtravel of the control member.

5. In a fluid-pressure system having support means and including a port through which fluid may flow, the improvement comprising: first and second relatively movable valves adapted to be carried by the support for movement toward and away from the port, the first valve being constructed for movement a relatively short distance to throttle the port, and the second valve being constructed to move a relatively greater distance to close the port; means for acting directly between the support means and the first valve to bias the first valve away from the port; a control member movable relative to the valves and toward and away from the port; means acting between the first valve and the control member and operative both to bias the control member away from the port and also to transmit force from movement of the control member toward the port to move the first valve to throttle the port, said means being constructed to accommodate overtravel of the control member toward the port after the port is throttled by the first valve; and means acting between the control member and the second valve for moving the second valve through its relatively greater distance to close the port upon predetermined overtravel of the control member.

6. Valve mechanism of the character described, comprising: an elongated control member having a terminal end and an outwardly facing recess closely behind said end; an inner valve having an axial bore therein receiving said end and providing an annular wall surrounding said end and said recess and arranging the valve and control member for relative movement lengthwise of the control member and axially of the valve, said annular wall having a radial opening therethrough in register with said recess; biasing means within the valve bore and acting between the valve and said end of the control member to separate the two axially; a lock element in said opening and entering the recess to prevent such separation of the control member and valve;

and an outer valve having an axial bore axially slidably receiving the inner valve and providing an annular wall surrounding the aforesaid opening and confining the lock element against radial escape from said opening.

7. Valve mechanism of the character described, comprising: an elongated control member having a cylindrical end portion provided with a terminal end and an outwardly facing annular groove closely behind said end; an inner valve having an axial bore therein receiving said end and providing an annular wall surrounding said end and said groove and arranging the valve and control member for relative axial movement, said annular wall having a radial opening therethrough in register with said groove; biasing means within the valve bore and acting between the valve and said end of the control member to separate the two axially; a lock element in said opening and entering the groove to prevent such separation of the control member and valve; and an outer valve having an axial bore axially slidably receiving the inner valve and including an elongated portion overlying the aforesaid opening and confining the lock element against radial escape from said opening.

EDWARD H. FLETCHER.
PAUL L. HANSON.
TAKURO NAKAE.

No references cited.